United States Patent [19]

VanMeter

[11] Patent Number: 4,662,055

[45] Date of Patent: May 5, 1987

[54] FLANGE ALIGNMENT TOOL AND METHOD FOR USING SAME

[75] Inventor: Charles VanMeter, Melbourne Beach, Fla.

[73] Assignee: CF Industries, Inc., Long Grove, Ill.

[21] Appl. No.: 712,374

[22] Filed: Mar. 15, 1985

[51] Int. Cl.⁴ .................... B23Q 3/00; B25B 27/14
[52] U.S. Cl. ............................ 29/467; 29/271; 29/407; 29/464; 29/DIG. 105; 33/613; 33/626
[58] Field of Search ....... 29/271, 270, 272, DIG. 105, 29/407, 464, 467; 248/201, 231.1; 33/203.18, 180 R, 185 R; 73/480

[56] References Cited

U.S. PATENT DOCUMENTS

| | | | |
|---|---|---|---|
| 2,531,799 | 11/1950 | Zumwalt | 29/271 |
| 3,735,472 | 5/1973 | Silverman | 29/272 |
| 4,345,464 | 8/1982 | Herzl et al. | 29/272 X |
| 4,547,096 | 10/1985 | Daigle et al. | 29/464 X |

Primary Examiner—Howard N. Goldberg
Assistant Examiner—R. S. Wallace
Attorney, Agent, or Firm—Trexler, Bushnell & Wolters, Ltd.

[57] ABSTRACT

A flange alignment tool comprises a body portion having a first, relatively flat surface disposed for abutting engagement with a rear surface of a pipe flange and a second, curvilinear surface adjacent the first surface and shaped for complementary engagement with a curvilinear neck portion of the pipe flange adjacent the rear surface thereof. First and second spaced apart aligning pins extend through the body portion and include projecting flange-engaging pin ends positioned for alignment with an adjacent pair of through apertures in the flange. Resilient springs urge the aligning pins in a predetermined direction for encouraging positive engagement of the flange-engaging pin ends with the through apertures.

A method for aligning a pair of pipe flanges, each having a plurality of through apertures, at opposite ends of a length of pipe, comprises permanently attaching a first flange to a first end of said pipe, inserting an alignment tool having a flat surface into two adjacent ones of the through apertures of the first flange, applying a level to the flat surface and rotating the pipe and first flange until the level indicates a level position. A second flange is placed about the opposite end of said pipe, and the tool is inserted through two adjacent ones of the through apertures of the second flange. The level is then applied to the flat surface of the tool and the second flange is rotated while holding the pipe stationary until the level indicates a level position. The second flange is then permanently attached to said opposite end of the pipe.

16 Claims, 8 Drawing Figures

FLANGE ALIGNMENT TOOL AND METHOD FOR USING SAME

BACKGROUND OF THE INVENTION

This invention is directed generally to a tool and related method for aligning a pair of similar pipe flanges at opposite ends of a length of pipe.

Individual lengths of pipe are generally joined together or to other apparatus by coupling with similar apertured flanges at respective ends thereof, using bolts or the like. These flanges are normally welded or otherwise permanently affixed to the two ends of a length of pipe. Hence, ease of coupling together a plurality of aligned lengths of pipe requires that the bolt holes in the flanges of each of the pipes to be joined be in alignment. However, the flanges are normally neither applied to the pipes in the field nor adjustable with respect to the pipes in the field. Hence, to assure alignment of flange bolt holes from one length of pipe to the next, it is necessary that the flanges on each end of each length of pipe be attached thereto with their bolt holes in coaxial alignment. It will be appreciated that such alignment is also important when replacing a length of pipe in the field, as it permits ready alignment of the flanges at both ends of the replacement pipe with the respective flanges of the adjacent length of pipe to either side thereof.

The most widely used current method of bolt hole alignment is commonly referred to as "true holing" or "two holing" of the flanges. This method of alignment involves first permanently attaching a flange to one end of the pipe, inserting bolts into two adjacent bolt holes and rotating both pipe and flange until a small level supported by the bolts indicates a level position. Thereafter, a loose flange is placed on the opposite end of the pipe and a pair of bolts inserted into adjacent bolt holes of the second flange. The level is then supported on these bolts and the loose flange is rotated with the pipe remaining stationary until the level again indicates a level position. The loose flange is then permanently attached to the pipe in that position, resulting in its bolt holes being substantially coaxially aligned with the bolt holes of the first flange at the opposite end of the pipe.

While the foregoing system of alignment has been widely used for many years, it does not always result in perfect alignment and leaves some areas for improvement. For example, clearance between the bolts and bolt holes in a typical flange is sufficient to permit some tilting or cocking of each bolt with respect to its bolt hole. Often, workers will use even a smaller size of bolt for convenience in insertion through the bolt holes, which results in even a greater potential for such tilting and cocking of the bolts. Hence, with the level in the foregoing method of alignment being supported by such tilted or cocked bolts, there is no assurance that the "level" position obtained at one end of the pipe will be matched by the "level" position at the opposite end. That is, the amounts and directions of tilting or cocking of the bolts are unpredictable and hence cannot be assumed to be the same at both ends of the pipe when the foregoing procedure is followed. Once the preassembled pipe and flanges are in the field, the resulting inaccuracies can cause delays and high labor costs in installation, repair and/or replacement of pipe.

OBJECTS AND SUMMARY OF THE INVENTION

Accordingly, it is an object of the invention to provide a novel and improved pipe flange alignment tool for overcoming the foregoing problems.

A related object is to provide a novel and improved method for aligning pipe flanges which avoids the foregoing problems.

Briefly, and in accordance with the foregoing objects, a flange alignment tool in accordance with the invention comprises a body portion having a first relatively flat surface disposed for abutting engagement with a rear surface of a pipe flange and a second curvilinear surface adjacent to said first surface and shaped for complementary engagement with a curvilinear neck portion of said pipe flange adjacent said rear surface thereof; first and second spaced apart aligning pin means extending through said body portion and including flange-engaging pin ends positioned for alignment with an adjacent pair of through apertures in said pipe flange; and resilient means for urging said aligning pin means in a predetermined direction for encouraging positive engagement between said flange-engaging ends and said through apertures.

In accordance with another aspect of the invention, there is provided a method for aligning a pair of pipe flanges, each having a plurality of through apertures, at opposite ends of a length of pipe, comprising the steps of permanently attaching a first flange to a first end of said pipe; inserting an alignment tool having a flat surface into two adjacent ones of said through apertures of said first flange; attaching a level to said flat surface; rotating the pipe and first flange until the level indicates a level position; placing a second flange about the opposite end of said pipe; inserting said tool through two adjacent ones of said through apertures of said second flange; attaching said level to the flat surface of said tool; rotating said second flange while holding said pipe stationary until said level indicates a level position; and permanently attaching said second flange to said opposite end of said pipe.

BRIEF DESCRIPTION OF THE DRAWINGS

The features of the present invention which are believed to be novel are set forth with particularity in the appended claims. The organization and manner of operation of the invention, together with further objects and advantages thereof, may best be understood by reference to the following description taken in connection with the accompanying drawings in the several figures of which like reference numerals identify like elements, and in which:

DETAILED DESCRIPTION OF THE ILLUSTRATED EMBODIMENT

Figure 1:
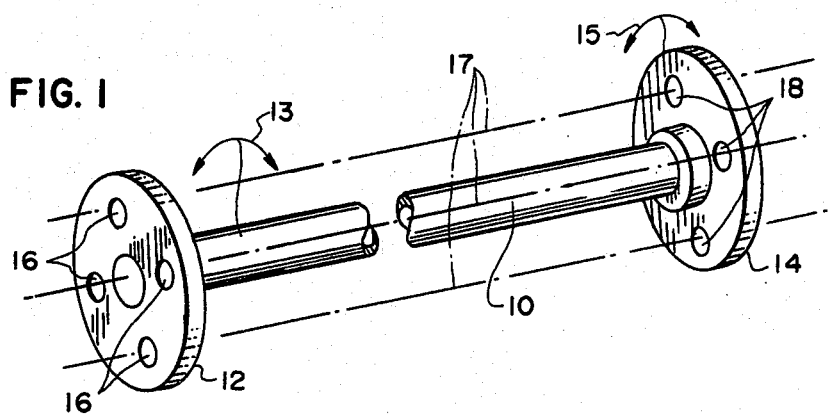
FIG. 1 is a perspective view, partially broken away, of a length of pipe having pipe end flanges at opposite ends thereof, and illustrating a portion of the method of the invention.
Figure 2:
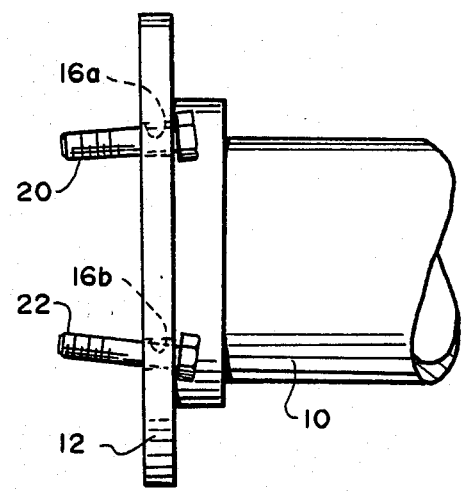
FIG. 2 is an enlarged top plan view, partially broken away, illustrating the prior art method for aligning end flanges.

Referring now to the drawings, and initially to FIGS. 1 and 2, the prior art method of aligning pipe flanges at opposite ends of a length of pipe will initially be described. In this regard, a length of pipe 10 is provided with respective similar pipe flanges 12 and 14 at its opposite ends. Each of these flanges 12 and 14 is provided with a plurality of through apertures 16, 18 for receiving coupling means such as bolts or the like for coupling the length of pipe 10 to apparatus such as other similar lengths of pipe at either end thereof. As previously mentioned, the most widely used method of bolt hole alignment is commonly referred to as "true holing" or "two holing" of the flanges.

This method of alignment involves initially permanently attaching one flange such as flange 12 to one end of the pipe 10. As illustrated in FIG. 2, the prior art method next contemplates inserting bolts 20, 22 into two adjacent bolt holes 16a and 16b of the through apertures or bolt holes 16 of flange 12. Thereafter, both pipe 10 and flange 12 are rotated until a small level (not shown) placed on and supported by bolts 20 and 22 indicates a level position. Therafter a loose flange 14 is placed on the opposite end of the pipe 10 and a similar pair of bolts are inserted into adjacent ones of the bolt holes or apertures 18 of second flange 14. A small level is then placed on these latter bolts and the loose flange of 14 is then rotated with pipe 10 remaining stationary until the level again indicates a level position. The foregoing procedure is intended to place the individual ones of bolt holes 16 and 18 in coaxial alignment. The rotation of the pipe 10 and first flange 12 is indicated generally by arrows 13, while the rotation of second flange 14 prior to its attachment to pipe 10 is indicated by arrows 15. The desired coaxial alignment of through apertures or bolt holes 16 and 18 is indicated by imaginary axes or lines 17.

However, and referring more particularly to FIG. 2, it will be seen that placement of a level upon bolts 20 and 22 in apertures or bolt holes 16a and 16b does not necessarily result in predictable and repeatable alignment from one end of the pipe to the other. This is because there is some clearance between bolts 20, 22 and the bolt holes 16a and 16b, and thus clearance is often sufficient to permit some tilting or cocking of each bolt with respect to its associated bolt hole. Such tilting and cocking is indicated in FIG. 2. Moreover, workers will often use a smaller size of bolt for convenience of insertion through the bolt holes, which results in an even greater potential for such tilting and cocking of the bolts. Clearly, the amounts and directions of the tilting are unpredictable and cannot be assumed to be the same at both ends of the pipe when the foregoing two-holing alignment procedure is followed. Accordingly, it cannot be assumed that a level supported by bolts at either end of the pipe will indicate the same "level" position.

Referring now to the remaining drawings the invention provides a novel alignment tool designated generally by the reference numeral 30, and a related method for alignment of flanges, utilizing this novel tool 30. The method in accordance with the invention includes permanently attaching the first flange 12 to one end of the length of pipe 10, and thereafter inserting alignment tool 30 into two adjacent ones, for example 16a and 16b, of the through aperture 16 of the flange 12. In this regard, the alignment tool will be seen to include a base or body portion 32 which includes a flat upper surface 34 as viewed in FIGS. 3, 4 and 5, and a pair of outwardly projecting aligning pins or pin means 36 and 38 for insertion through the through apertures or bolt holes 16a and 16b.

The method of the invention further includes applying a level to the flat surface 34 and rotating the attached pipe 10 and flange 12 until the level indicates a level position. Thereafter, a second flange 14 is placed about the opposite end of pipe 10 and the tool 30 is inserted into two adjacent ones of the through apertures 18 of the second flange 14. The level is then similarly applied to flat surface 34 and the second flange 14 is rotated while holding the pipe stationary until the level again indicates a level position. Thereupon, the flange 14 may be permanently attached to the end of pipe 10.

Referring now to FIGS. 3 through 8, the body portion 32 of tool 30 includes a first, relatively flat surface 40 disposed for abutting engagement with a rear surface 12a of the pipe flange 12. A second, curvilinear surface 42 is defined adjacent the first surface 40 and is disposed and shaped for complementary engagement with a curvilinear neck portion 12b of the pipe flange 12 which is adjacent the rear surface 12a thereof. It will be noted that a flange neck portion 12b extends substantially a right angles to the rear surface 12a thereof. Accordingly, the second, curvilinear surface 42 of the body 32 extends substantially at right angles to the first, flat suface 40 thereof. Moreover, this surface 42 has a generally arcuate curvature which is complementary with the curvature of the flange neck portion 12b. In this regard, the top surface 34 will be seen to be substantialy flat and level and formed at substantially right angles to the first or front surface 40. The aligning pins or pin means 36 and 38 are generally equally spaced from this top surface 34.

Figure 3:
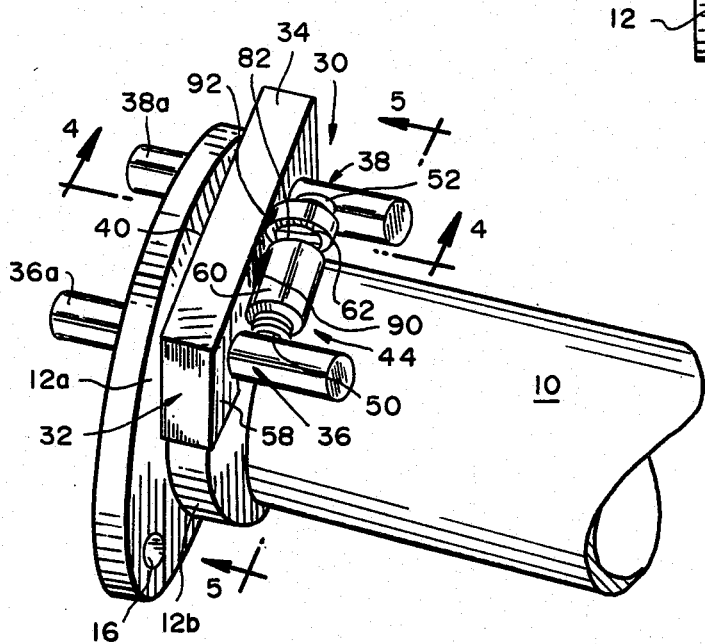
FIG. 3 is a perspective view, partially broken away, of an end of a pipe to which a flange is coupled utilizing the tool and method of the invention.
Figure 4:
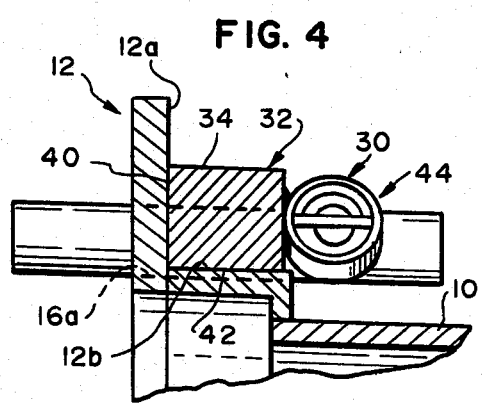
FIG. 4 is an enlarged, partial sectional view taken generally in the plane of the line 4—4 of FIG. 3.
Figure 5:
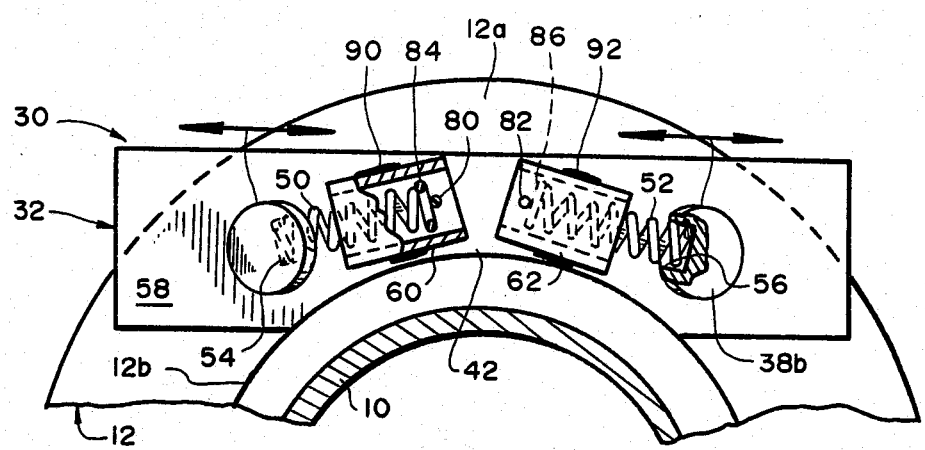
FIG. 5 is an enlarged, partial sectional view taken generally in the plane of the line 5—5 of FIG. 3.
Figure 6:
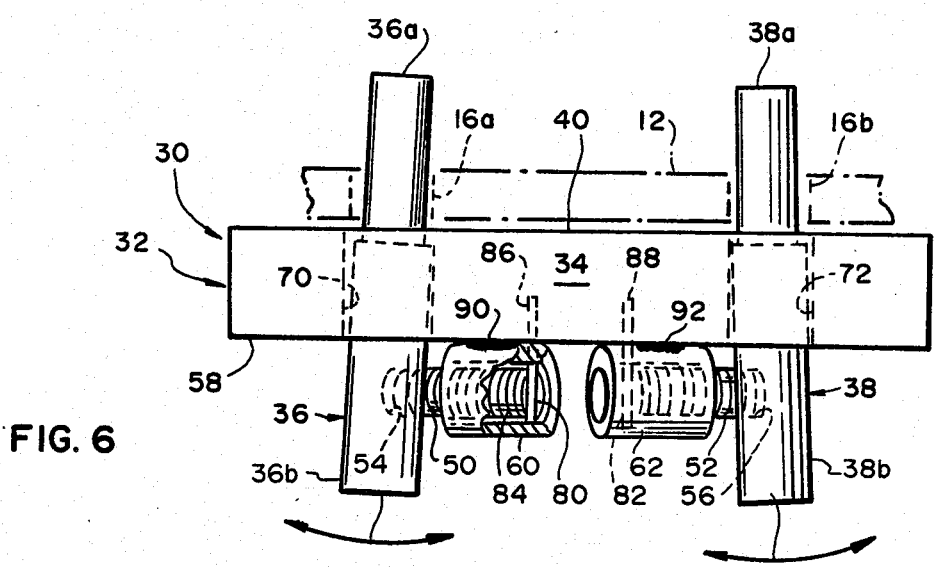
FIG. 6 is a top plan view of the tool of the invention.
Figure 7:
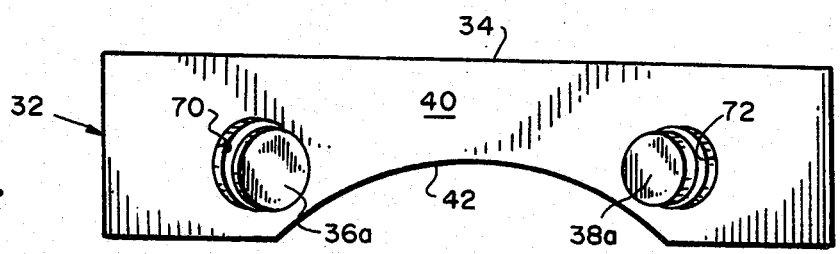
FIG. 7 is a front elevation of the tool of the invention.
Figure 8:
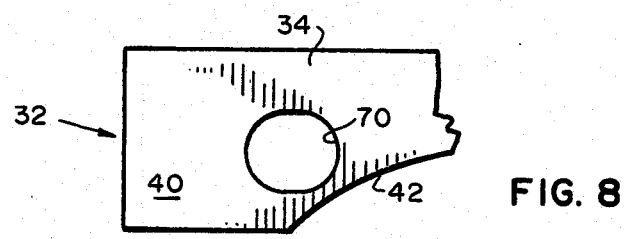
FIG. 8 is a partial elevation of a body portion of the tool of the invention.

The previously mentioned first and second aligning pins or pin means 36 and 38 extend through the body 32 and include projecting, flange-engaging pin ends 36a, 38a positioned for alignment with an adjacent pair of through apertures 16a and 16b of the flange 12. In accordance with the invention, resilient means designated generally by reference numeral 44 are provided for urging the aligning pins or pin means 36 in a predetermined direction for encouraging positive engagement of the through apertures by the flange-engaging pin ends 36a and 38a. In the illustrated embodiment, this direction is generally outwardly and somewhat upwardly with respect to the direction or orientation of tool 30 as illustrated in FIGS. 3 and 5.

In the illustrated embodiment, the resilient means 44 will be seen to comprise a pair of substantially cylindrical coil compression springs 50 and 52, one associated with each of the aligning pins 36 and 38. In this regard, each of the aligning pins 36 and 38 includes a gripping portion 36b, 38b which extends outwardly of a rear surface 58 of the tool body 32 in the direction opposite the flange-engaging pin ends 36a, 38a thereof. Each of these gripping portions 36b, 38b includes a recess 54, 56, for receiving one end of one of the springs 50, 52 therein. In the illustrated embodiment, the rear surface 58 of the tool body 32 is also substantially flat and is substantially parallel with and spaced apart from the first surface 40 by the flat top surface 34 and curvilinear bottom surface 42.

Mounting means comprising a pair of sockets or socket means 60, 62 are coupled to the rear surface 58 for receiving ends of the springs 50, 52 opposite the ends thereof received in recesses 54 and 56. In the illustrated embodiment, these sockets or socket means 60 and 62 are mounted intermediate the gripping portions 36b and 38b for aligning the springs so as to urge the gripping portions generally oppositely outwardly, as best viewed in FIGS. 5 and 6. Consequently, the flange-engaging pin ends 36a and 38a are thereby urged generally inwardly with respect to each other for positive gripping engagement with the pipe flange through apertures 16a and 16b as indicated in phantom line in FIG. 6.

In the illustrated embodiment, the sockets or socket means 60, 62 are also mounted to the rear surface 58 of body portion 32 somewhat upwardly of the location of the aligning pins 36 and 38 with respect to the flange neck portion 12b. This thereby positions the springs 50 and 52 for imparting an additional upward component to the generally inward movement of the flange engaging pin ends 36a and 38a. In this regard, it should be noted that the resilient means including springs 50 and 52 are substantially symmetrically formed with respect to the body 32 for generally symmetrically urging the pins or pin means 36 and 38 in generally opposite directions for engagement with the through apertures 16a and 16b of the flange 12.

Cooperatively, the tool body portion 32 includes through apertures 70 and 72 for receiving the aligning pins 36 and 38 therethrough. These through apertures 70 and 72 are preferably of larger cross-sectional dimension in at least one direction than the cross-sectional dimensions of the aligning pins 36 and 38. This permits some degree of pivotal motion of the aligning pins in response to the urging of the resilient means 50 and 52, so as to urge the ends 36a and 38a of the pins generally inwardly and upwardly as described above. In the illustrated embodiment, the through apertures 70 and 72 are generally elliptical in cross-sectional configuration, as best viewed in FIG. 8.

Further with respect to engagement of through apertures 16a and 16b, the flange-engaging pin ends 36a and 38a may be sized to interfit in a desired fashion with flange through apertures of a given size or range of sizes. In the illustrated embodiment, these pin ends 36a and 38a are therefore of reduced diameter with respect to the gripping end portions 36b, 38b thereof.

Referring now more particularly to the socket means 60, 62 and mounting of the springs 50 and 52 therein, it will be seen that each socket comprises an open-ended tubular member. Stop means, here comprising retaining pins 80, 82 and washers 84, 86 are utilized with each of these sockets or tubular members 60, 62 for abutting the end of the spring 50 or 52 received therein. Accordingly, the other end of each spring extends outwardly of the associated socket or tubular member for engagement with the associated recess 54 or 56 in the pin gripping portions 36b, 38b.

Each of the retaining pins 80 and 82 extends transversely of its associated tubular member or socket adjacent an end thereof opposite the end from which the spring extends. The retaining washers 84 and 86 provide suitable abutment surfaces for the facing ends of respective springs 50 and 52. Preferably, the retaining pins 80 and 82 also extend into apertures 86, 88 provided therefor in the body 32 to accomplish mounting of the sockets 60 and 62 thereto. Additional mounting of the sockets in the positions illustrated is accomplished by suitable means such as welding as generally indicated at 90 and 92.

In use, the alignment tool 30 may be placed on a flange such as flange 12, as illustrated in FIG. 3. The installer may grip the ends or gripping portions 36b, 38b and depress these ends against the outward urging of springs 50 and 52 to accomplish initial alignment for insertion of ends 36a and 38a of the pins with through apertures 16a and 16b of the flange 12. Thereupon, the tool 30 is advanced until the flat leading surface 40 thereof abuts the flat rear surface 12a of the flange 12. Advantageously, the respective surfaces 40 and 42 of the tool now align with and abut respective surfaces 12a and 12b of the pipe flange 12, thereby accomplishing a firm seating of the tool with respect to the pipe flange. This complementary interfitting between respective surfaces assures that the tool 30 can be accurately and repeatably aligned with successive pipe flanges to accomplish the desired coaxial alignment of through apertures thereof at opposite ends of a length of pipe 10 as illustrated in FIG. 1. Upon release of the gripping portions 36b, 38b, the action of springs 50 and 52 will cause the above-described gripping engagement of the respective pins 36 and 38 with the through apertures 16a and 16b of pipe flange 12. The foregoing factors assure firm and positive engagement of the tool 30 with the pipe flange 12, and provide a stable base at surface 34 for receiving a level.

While particular embodiments of the invention have been shown and described in detail, it will be obvious to those skilled in the art that changes and modifications of the present invention may be made without departing from the invention in its broader aspects, some of which changes and modifications being matters of routine engineering or design, and others being apparent only after study. As such, the scope of the invention should not be limited by the particular embodiments and specific constructions described herein but should be defined by the appended claims and equivalents thereof. Accordingly, the aim in the appended claims is to cover all such changes and modifications as fall within the true spirit and scope of the invention.

The invention is claimed as follows:

1. A method for aligning a pair of pipe flanges, each having a plurality of through apertures, at opposite ends of a length of pipe, comprising: permanently attaching a first flange to a first end of said pipe; coupling an alignment tool having a flat surface spanning at least two adjacent ones of said apertures with said through aperture of said first flange spanned by said flat surface; applying a level to said flat surface; rotating the pipe and first flange until the level indicates a level position; placing a second flange about the opposite end of said pipe; coupling said tool with two of said through apertures of said second flange spanned by said flat surface; applying said level to the flat surface of said tool; rotating said second flange while holding said pipe stationary until said level indicates a level position; and permanently attaching said second flange to said opposite end of said pipe.

2. A flange alignment tool comprising: a single body portion having a first, relatively flat surface disposed for abutting engagment with a rear surface of a pipe flange and spanning at least two through apertures in said flange and a second, curvilinear surface adjacent to and orthogonal with said first surface and shaped for complementary engagement with a curvilinear neck portion of said pipe flange adjacent said rear surface thereof; first and second spaced apart aligning pin means, each defining an axis, coupled with and extending through said body portion and including projecting flange-engaging pin ends positioned for alignment with said at least two through apertures in said flange; and resilient means for urging each of said aligning pin means in a predetermined direction generally transverse to its axis for encouraging positive engagement of said flange-engaging pin ends with said through apertures.

3. A tool according to claim 2 wherein said resilient means comprises a pair of cylindrical coil compression springs, one associated with each of said aligning pin means.

4. A tool according to claim 3 wherein each of said aligning pin means further includes a gripping portion extending outwardly of said body in a direction opposite said flange-engaging pin ends and wherein each said gripping portion includes a recess for receiving one end of one of said springs therein.

5. A tool according to claim 4 and further including mounting means for mounting said resilient means to said body portion.

6. A tool according to claim 5 wherein said body portion includes a rear surface substantially parallel with and spaced apart from said first surface thereof and wherein said mounting means comprises a pair of socket means coupled to said rear surface for receiving opposite ends of the respective springs therein.

7. A tool according to claim 6 wherein said socket means are mounted intermediate said gripping portions for aligning said springs so as to urge said gripping portions generally oppositely outwardly, thereby urging said flange-engaging pin ends generally inwardly with respect to each other for positive gripping engagement with said pipe flange through apertures.

8. A tool according to claim 6 wherein each of said socket means comprises an open-ended tubular member and further including stop means coupled with each said tubular member for abutting the opposite end of said spring therein, whereby said one end of said spring extends outwardly of said tubular member for engagement with said recess in said pin means gripping portion.

9. A tool according to claim 8 wherein each of said stop means comprises an elongate pin extending transversely of said tubular member adjacent an end portion thereof opposite the one end of said tubular member from which said one end of said spring extends.

10. A tool according to claim 7 wherein said socket means are further mounted to said body portion upwardly of the location of said aligning pins therethrough with respect to said flange neck portion so as to position said springs for imparting an upward component to the generally inward movement of said flange-engaging pin ends of said alignment pin means.

11. A tool according to claim 2 wherein said body portion further includes through apertures for receiving said aligning pin means therethrough.

12. A tool according to claim 11 wherein said through apertures are of larger cross-sectional dimension in at least one direction than the cross-sectional dimension of said aligning pin means to permit pivotal motion of said aligning pin means therein.

13. A tool according to claim 12 wherein said through apertures of said body portion are generally elliptical in cross-sectional configuration.

14. A tool according to claim 5 wherein said flange-engaging pin ends of said pin means are sized to interfit with said through apertures of said flange and are of reduced diameter with respect to said gripping portions thereof.

15. A tool according to claim 2 wherein said body portion includes a substantially flat and level top surface formed at substantially right angles to said first surface thereof and wherein said aligning pin means are equally spaced from said top surface.

16. A tool according to claim 15 wherein said resilient means are symmetrically formed and disposed for symmetrically urging said pin means in generally opposite direction for engagement with said through apertures of said flange..

* * * * *